(12) United States Patent
Moses et al.

(10) Patent No.: US 9,329,726 B2
(45) Date of Patent: May 3, 2016

(54) SYSTEM AND METHOD FOR CAPTURING EDITABLE HANDWRITING ON A DISPLAY

(71) Applicant: QUALCOMM Incorporated, San Diego, CA (US)

(72) Inventors: Daniel Moses, San Diego, CA (US); Robert Mitchell Kleiman, San Diego, CA (US); Candice Ruth Mudrick, San Diego, CA (US); Milivoje Aleksic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 13/779,158

(22) Filed: Feb. 27, 2013

(65) Prior Publication Data
US 2014/0118306 A1 May 1, 2014

Related U.S. Application Data

(60) Provisional application No. 61/719,246, filed on Oct. 26, 2012, provisional application No. 61/749,200, filed on Jan. 4, 2013.

(51) Int. Cl.
*G06F 3/042* (2006.01)
*C09D 11/50* (2014.01)
*G06K 9/20* (2006.01)
*C09D 11/17* (2014.01)

(52) U.S. Cl.
CPC ............... *G06F 3/042* (2013.01); *C09D 11/17* (2013.01); *C09D 11/50* (2013.01); *G06F 3/0425* (2013.01); *G06K 9/2018* (2013.01)

(58) Field of Classification Search
CPC . G06F 3/3545; G06F 3/0425; G06F 3/03545; G06F 3/042; G06F 2203/04109; C09D 11/17; C09D 11/50; G06K 9/2018
USPC ............. 178/18.09, 18.11; 345/175, 176, 179
See application file for complete search history.

(56) References Cited

U.S. PATENT DOCUMENTS

| 6,339,748 | B1 | 1/2002 | Hiramatsu |
| 6,828,959 | B2 * | 12/2004 | Takekawa et al. ............ 345/173 |
| 8,274,496 | B2 | 9/2012 | Ung et al. |
| 8,971,568 | B1 * | 3/2015 | Smits ............................. 382/100 |
| 2003/0025316 | A1 | 2/2003 | Solomon et al. |
| 2007/0296698 | A1 * | 12/2007 | Kanno ........................... 345/158 |

(Continued)

OTHER PUBLICATIONS

International Search Report and Written Opinion—PCT/US2013/066430—ISA/EPO—Feb. 20, 2014.

*Primary Examiner* — Amr Awad
*Assistant Examiner* — Aaron Midkiff
(74) *Attorney, Agent, or Firm* — Knobbe Martens Olson & Bear LLP

(57) ABSTRACT

Systems, methods, and apparatus for a touch sensitive display device providing editable handwriting capture are described. A display device with a detachable front panel is capable of interactive touch sensing and editable handwriting capture. An ultraviolet or near ultraviolet light source and camera can be configured to capture images of textual input made on the detachable front panel of the device with a pen having water soluble fluorescent ink that is transparent or nontransparent such that the notes are visible under ultraviolet or near ultraviolet light and transparent when little or no ultraviolet or near ultraviolet light is present. The detachable front panel may be removed from the display device for cleaning and ease of use.

12 Claims, 7 Drawing Sheets

(56) References Cited

U.S. PATENT DOCUMENTS

| | | | |
|---|---|---|---|
| 2008/0179507 A2* | 7/2008 | Han | 250/224 |
| 2011/0043490 A1* | 2/2011 | Powell | G06F 3/0421 345/176 |
| 2011/0205209 A1 | 8/2011 | Kurokawa et al. | |
| 2011/0221705 A1* | 9/2011 | Yi et al. | 345/175 |
| 2011/0241987 A1 | 10/2011 | Howse | |
| 2011/0279679 A1 | 11/2011 | Samuel et al. | |
| 2011/0310066 A1 | 12/2011 | Fermgard et al. | |
| 2012/0032925 A1 | 2/2012 | Sekiya | |
| 2012/0153134 A1* | 6/2012 | Bergstrom | G06F 3/042 250/221 |

* cited by examiner

SYSTEM AND METHOD FOR CAPTURING EDITABLE HANDWRITING ON A DISPLAY

CROSS-REFERENCE TO RELATED APPLICATIONS

The application claims the priority benefit of U.S. Provisional Application No. 61/719,246, entitled "SYSTEM AND METHOD FOR CAPTURING EDITABLE HANDWRITING ON A DISPLAY," filed Oct. 26, 2012, and U.S. Provisional Application No. 61/749,200, entitled "SYSTEM AND METHOD FOR CAPTURING EDITABLE HANDWRITING ON A DISPLAY," filed Jan. 4, 2013, the entireties of which are incorporated herein by reference.

TECHNICAL FIELD

The devices, systems and methods disclosed herein relate generally to user interfaces for electronic devices, and more particularly to capturing editable handwriting on a display of an electronic device.

BACKGROUND

Touch sensing displays are a popular interface on electronic devices, allowing users to enter commands and data easily. Touch displays can be found in mobile devices, electronic displays, tablets, laptops, and desktop computers. Touch displays are generally designed to operate and respond to a finger touch, stylus touch, finger movement, or stylus movement on the touch screen surface.

Touching a specific point on the touch display may activate a virtual button, feature, or function found or shown at that location on the touch display. Typical features may include, for example, making a phone call, entering data, opening or closing a browser window, among other functions.

In some environments, a user may desire to enter information directly on the touchscreen using a pen. The user may prefer to interact directly with a media server by writing sticky notes, marking calendars, or sketching a drawing. Such input has typically been done using an electronic stylus.

In some environments, use of an electronic stylus may be inconvenient, such as in a messy environment where dirt or residue may impact the effectiveness of the stylus. In such environments, it may be difficult to interact directly with the media server using a traditional input device. Additionally, the user may want to easily edit the input prior to final capture by the system.

SUMMARY

The systems, methods, and devices of the present disclosure each have several innovative aspects, no single one of which is solely responsible for the desirable attributes disclosed herein.

In one aspect, a system for editable handwriting capture comprises an ultraviolet or near ultraviolet light source and a camera mounted behind a display to capture writing on the front of the display. In some embodiments, the system may further comprise a detachable front panel, which also provides touch interaction using pressure sensors. Some embodiments of the detachable front panel may comprise bezel-less glass. In environments where the display device is exposed to dirt or grease, having no bezel provides the benefit of preventing the dirt or grease from collecting at contact lines between a bezel and the glass, which can be difficult to completely clean from the glass. The detachable nature of the front panel allows a user to comfortably use the display in a messy environment, as the front panel may be removed for cleaning while the display itself remains untouched by dirt or grease. Further, in environments where the display may become scratched or damaged, having a detachable panel to protect the display extends the life of the display by having an easily replaceable component exposed to the damage.

In some aspects, a user's hands may be insufficiently clean to interact with the display device through touching the screen. In these scenarios, the user can interact with the display device by writing or drawing directly on the front panel of the display device with a pen having water soluble transparent or nontransparent fluorescent ink or other marking device that may be easily wiped off the front panel.

One embodiment is a touch-sensitive display device that includes a first panel configured to display information from an electronic device, a transparent second panel detachably secured to the first panel and configured to cover the first panel, at least one ultraviolet or near ultraviolet light unit configured to provide UV light to an edge of the transparent second panel, and a camera mounted behind the first and second panels configured to capture an image of fluorescent markings made on the transparent second panel.

Another embodiment is a system to capture textual input on a touch-sensitive display device that includes a touch-sensitive display device having a first panel configured to display information from an electronic device, a transparent second panel detachably secured to the first panel and configured to cover the first panel, at least one ultraviolet or near ultraviolet light unit configured to provide UV light to an edge of the transparent second panel, and a camera mounted behind the first and second panels configured to capture an image of fluorescent markings made on the transparent second panel. The system further includes a control module configured to activate the at least one ultraviolet or near ultraviolet light unit when the device enters a textual input mode, capture one or more images of the fluorescent markings made on the second panel of the touch-sensitive display device, deactivate the at least one ultraviolet or near ultraviolet light unit when the device exits a textual input mode, and store the images of the fluorescent markings in a memory location.

Yet another embodiments is a touch-sensitive display device that includes a touchscreen having a front and a back and capable of detecting a user's touch, means for providing an ultraviolet or near ultraviolet light when the device enters a textual input mode, means for activating the ultraviolet light unit when the device enters a textual input mode, means for capturing one or more images of fluorescent markings made on the transparent second panel, and means for deactivating the ultraviolet light unit and discontinuing capture of images of fluorescent markings when the device exits a textual input mode.

Still another embodiment is a method for capturing textual input on a touch-sensitive display device that includes the steps of detecting pressure from a user touch on the touch-sensitive device, activating an ultraviolet light unit when the device enters a textual input mode, capturing one or more images of fluorescent markings made on the touch-sensitive display device, and deactivating the ultraviolet light unit and discontinuing capture of images of fluorescent markings when the device exits a textual input mode.

One other embodiment is a non-transitory computer-readable storage medium that has instructions that when executed by a processor perform a method of inputting data into a touch-sensitive electronic device. The method includes the steps of activating an ultraviolet light unit when the device enters a textual input mode, capturing one or more images of fluorescent markings made on the touch-sensitive display device, and deactivating the ultraviolet light unit and discontinuing capture of images of fluorescent markings when the device exits a textual input mode.

BRIEF DESCRIPTION OF THE DRAWINGS

The disclosed aspects will hereinafter be described in conjunction with the appended drawings and appendix, provided to illustrate and not to limit the disclosed aspects, wherein like designations denote like elements.

DETAILED DESCRIPTION

Figure 1:
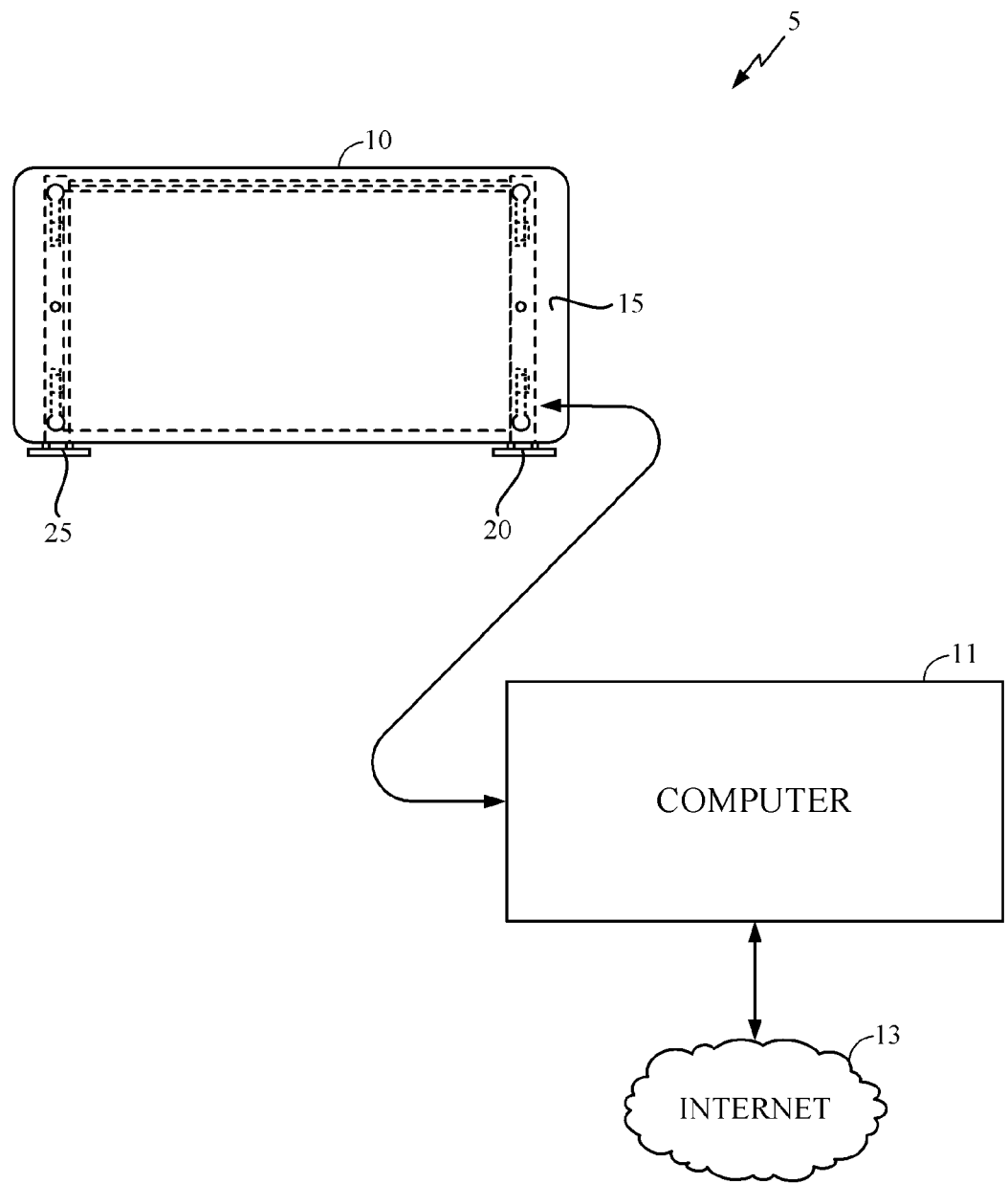
FIG. 1 is a schematic of a touch sensitive display system and apparatus with a detachable front panel, according to one implementation.

Embodiments relate to the use of imaging systems to input information into an electronic system. In one embodiment, implementations include systems, devices, methods, and apparatus for a display device with editable handwriting capture functions. For example, in one embodiment, the device may have a frame holding a display screen that is used to display information and media to a user from an attached electronic system. The display panel may be covered by a removable, transparent panel that may be secured to the frame using magnets or other means for holding the panel in place. An ultraviolet or near ultraviolet light source and a camera may also be used to illuminate and capture editable handwriting made on the display using a water soluble or insoluble fluorescent marking device.

The display device may also provide touch sensing interaction. A plurality of pressure sensors may be attached to each corner of the display such that movement of the transparent panel with respect to the display produces a pressure sensor signal that is analyzed to determine a location of a user's touch, the type of a user command gesture, and to initiate an editable handwriting capture function. In some embodiments, the removable transparent panel is a bezel-less panel.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Display Device Overview

Embodiments of the invention relate to touch-sensitive devices having a detachable front panel wherein pressure sensors placed on the display and ultraviolet or near ultraviolet light sources and a camera placed behind the display provide interactive editable handwriting capture. User interaction with the device may take the form of handwriting, drawings, notes, sketches, or memos made directly on a detachable front cover of the touchscreen device. An image of the handwriting or notes may be captured by the camera mounted behind the display. The notes or memos may be made with a pen having water soluble fluorescent ink that is transparent or nontransparent such that the notes are visible under ultraviolet or near ultraviolet light and transparent when little or no ultraviolet or near ultraviolet light is present. Transparent ink of different colors may be used. The use of transparent ink allows the markings to become transparent when the ultraviolet light is turned off, allowing use of the display without erasing or removing the markings. Nontransparent or pigmented pens, such as white board markers, which also glow under ultraviolet light, could also be used in some embodiments if immediate transparency of the ink upon turning off the ultraviolet light is not desired. One exemplary device is described in U.S. Provisional Application No. 61/749,184, entitled "INTERACTIVE DISPLAY WITH REMOVABLE FRONT PANEL," filed on Jan. 4, 2013, the entirety of which is incorporated herein by reference.

Editable handwriting capture using ultraviolet or near ultraviolet light to fluoresce textual input and capturing an image of the input with a camera may be provided with a touch-sensitive display device as illustrated in the described embodiments. In other embodiments, editable handwriting capture may be provided on other electronic devices such as but not limited to laptop, desktop, or mobile devices.

FIG. 1 illustrates one embodiment of a touch sensitive display system 5 having a bezel-less, detachable transparent front panel 15 mounted on a frame structure (not shown) that is supported by legs 20, 25. The touch sensitive display system 5 is configured to display information to a user. As shown, the display 10 may be wire or wirelessly connected to a computer 11, such as a laptop, desktop or other processing device that is configured to display content to the user on the display 10. In some embodiments, computer 11 may be integrated into the display 10. The system 5 may also be wire or wirelessly connected to a wide area network 13, such as the Internet, via computer 11, in order to download content to the display 10 and upload user input from the touch sensitive display 10. The display 10 can include an ultraviolet or near ultraviolet light source and a camera (not shown), and can be configured to capture images of editable textual input such as sketches and handwriting made on the front panel 15, as will be described in further detail herein. A user can provide input to the system 5 by writing directly on the front panel 15 with a pen having water soluble transparent or nontransparent fluorescent ink or other marking device that may be easily wiped off the front panel. This input may be captured by the camera and correlated with a known application displayed on the display device. The input can include, for example, text, numbers, symbols, drawings, sketches, and/or control commands.

As shown in FIG. 1, the display 10 is a standalone display device. However, other devices suitable for communication with a network may be used. The display device 10 in connection with computer 11 can be used to transmit information to and receive information from other devices over the Internet 13. The information communicated can include, for example, voice, data, and/or multimedia services. The display device 10 and computer 11 can also be used to communicate over networks besides the Internet 13, including, for example, cellular networks.

The computer 11 and display device 10 can communicate using a variety of standards. For example, certain user devices can communication according to IEEE 16.11 standard, including IEEE 16.11(a), (b), or (g), or the IEEE 802.11 standard, including IEEE 802.11a, b, g or n. In some embodiments, the user device can include an antenna for transmitting and receiving RF signals according to the BLUETOOTH standard. For certain user devices, such as when the user device is a mobile phone, the user device can communicate using an antenna designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology.

Figure 2:
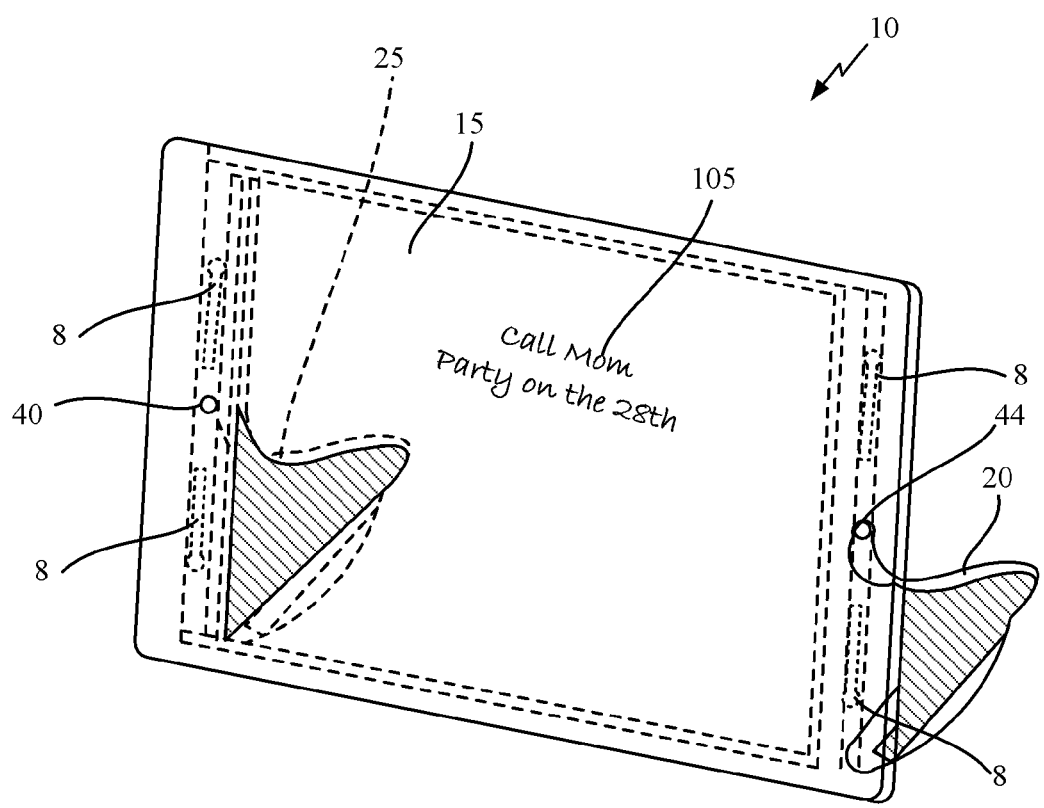
FIG. 2 is a front perspective view of a touch sensitive display device, according to one implementation

FIG. 2 shows a perspective view of one embodiment of the touch sensitive display device 10 with the detachable front panel 15. The display device 10 is supported by a frame 16 which is constructed from two legs 20 and 25 coupled to a back panel of glass (not shown). The legs 20 and 25 may be coupled to the back panel of glass by mechanical fasteners or by a bonding agent such as glue. An active display panel 17 provides the actual display of pixels that displays information to the user from a connected electronic system such as the computer 11, smart phone, or tablet. The active display panel 17 is positioned over the back panel of glass. The active display panel 17 can be any kind of flat panel technology, such as a transparent LCD or LED display. In some configurations, the active display panel 17 may be a 22 inch Samsung LTI220MT02 display with the bezel removed.

The transparent front panel 15 may be coupled to the frame 16 such that it entirely covers the active display panel 17. The front panel 15 may be made out of a transparent, high transmittance, nearly tint-free glass, and preferably comprises one substantially flat planar surface with no bezel. For example, in one configuration the front panel 15 may be made of Starphire glass, also known as Eurowhite, Opti White or Diamante, having a length of about 600 mm, height of about 340 mm, and thickness of about 3.3 mm. The front panel 15 may be detachably secured to the display panel 17 by a magnetic coupling between the front panel 15 and the legs 20 and 25 of the frame. This magnetic coupling may include a pair of magnets 40, 44 bonded to the underside of the front panel 15 within shallow grooves having a depth approximately equal to one half the thickness of the magnets 40, 44. The magnets 40, 44 are further configured to mount to matching magnetic holders (not shown) disposed in central positions within each leg 20 and 25. The placement of the magnets 40, 44 within the shallow grooves helps to align the magnets 40, 44 with corresponding magnets disposed in the legs 20, 25 and also helps to remove some load from the bonding agent holding the magnets to the front panel 15. The magnetic coupling of the front panel 15 to the display device 10 may also be achieved through a combination of magnets and a magnetically attractive material. This magnetic coupling allows the front panel 15 to be easily removed from the attached position in front of the active display panel 17 to be washed after use.

Ultraviolet or near ultraviolet (UV) light units 8 may be located on the legs 20 and 25 of the device 10, as shown in FIG. 2. The ultraviolet or near ultraviolet light units 8 may be placed on the front face of the legs of the device without any lens or enclosure surrounding them. The ultraviolet or near ultraviolet light units 8 may be pointed towards the sides of the device 10, allowing ultraviolet or near ultraviolet light to tunnel through front panel 15. In one embodiment, the ultraviolet or near ultraviolet light units may be LEDs that fit within notches on the underside of the front panel 15 approximately 1 mm deep. The front face or surface of grooves in the underside of the front panel 15 in which the UV light units 8 are disposed may be made opaque to prevent the direct transmission of ultraviolet or near ultraviolet light to the user's eyes. The housing cylinder surface of each groove may remain transparent to enable ultraviolet or near ultraviolet light tunneling into the front panel 15. When a user writes on the front panel 15 with a fluorescent marking device, stray UV light from within the glass causes the markings to fluoresce so they can be seen by a camera.

In some configurations, the ultraviolet or near ultraviolet light units 8 are four light sources attached to the front face of either or both legs of the device 10 to direct light such that it tunnels through the front panel 15. The UV light units 8 may be placed approximately near the corners of the active display panel 17 within the frame 16. In one configuration, the ultraviolet or near ultraviolet light units 8 may be LED light units that emit light at about a wavelength of about 390 nm. In some configurations, UV LEDs such as Cree® XLamp™ 7090 UVV LEDs may be used, but any similar LEDs may also be used.

Textual input 105 may be entered by directly drawing or writing on the front panel 15 of the display, as shown in FIG.

2. When the user is ready to interact with a device in a textual mode, the UV light units 8 will be turned on. The user may write a note 105 directly on the front panel 15 of the display device 10 using a pen having water soluble transparent or nontransparent fluorescent ink or other marking device that may be easily wiped off the front panel 15. Due to the fluorescence of the marking device, the textual input 105 will appear visible to the user and the camera when the UV light units 8 are on, since stray UV light will cause the textual input to fluoresce. When the user has finished making textual input on the front panel, an image of the textual input 105 may be captured by a camera (not shown) located behind the display 10. These images of a user's textual input 105 may be analyzed using gesture processing functions to determine an intended user command gesture. The textual input 105 may be edited by the user by erasing the markings using a cleaning cloth or other means. When the UV light units 8 are turned off, the textual markings 105 made with a fluorescent pen will no longer be visible to the user. This allows for use of the display without first erasing the user's marks. Note that in this embodiment user input is shown as textual input. The user may interact with the device by drawing sketches or making other non-textual markings on the display. These features are discussed in greater detail below.

Figure 3:
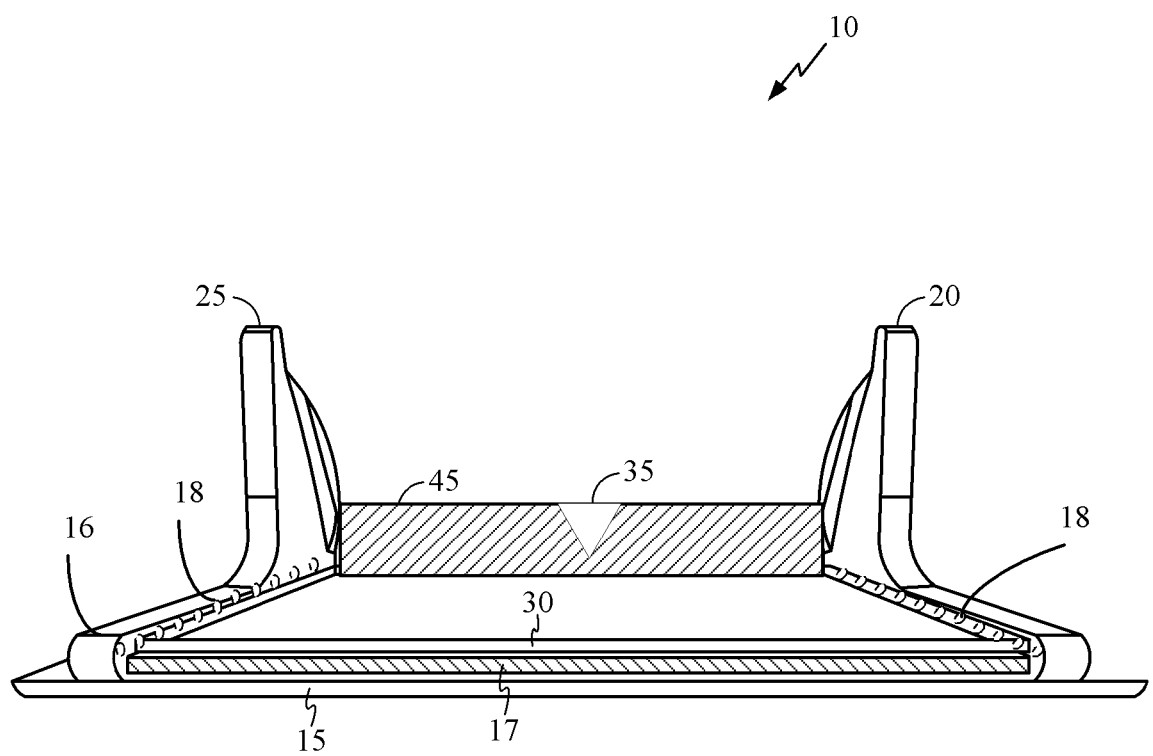
FIG. 3 is a top view of a touch sensitive display device having a camera mounted behind the display.

As shown in the top view FIG. 3, the front panel 15 is mounted directly adjacent the active display panel 17. The front panel 15 may have a larger width and height than the active display panel 17 and the back panel 30 so that it protrudes to the sides and above the frame 16. In some configurations, labels showing common measuring equivalents such as those used in cooking may be etched on the sides of the front panel 15 to provide useful information to the user. By being placed on the sides of the front panel 15 they may not overlap the active display panel 17 and obstruct a user's view of the information shown on the display. The front panel 15 may be larger than the underlying panels in order to facilitate easy grasping and removal of the front panel 15 for cleaning. In some configurations, the display device 10 has a thickness of approximately 1 inch from the front of the front panel 15 to the back of the back panel 30. In other configurations, the display device has a thickness of approximately 20 mm or ⅘ of an inch. In still further configurations, the display device may have a thickness of approximately ½ of an inch.

The legs 20 and 25 may be integrated into the back panel 30 or they may be bonded to the back panel 30. In some configurations, the legs 20 and 25 may be made of Plexiglas Acrylic or other rigid plastic to provide support and stability for the display device 10. The legs 20 and 25 may be approximately one inch in width or they may be other widths sufficient to securely support the weight of the device 10. In some embodiments, the legs 20 and 25 may contain one or more light sources, such as LED light strips 18, to provide back lighting for the active display panel 17. In other embodiments, the LED light strips 18 may be secured to the sides of the frame 16. The LED light strips 18 direct or tunnel light through the transparent back panel 30 to illuminate the active display panel 17.

The transparent back panel 30 may direct or bend the light from the LED strips 18 located on the legs 20 and 25 forward towards the transparent active display panel 17. In some configurations, the back panel 30 may be made of ACRYLITE® Endlighten T, version OF11L, which appears transparent and evenly redirects light throughout the surface of the back panel 30 to provide illumination for the display 10.

Disposed below the frame 16 is an electronics housing 45 which can be used to house any electronics required for running the display such as the processor to control the active display panel 17, backlight LED strips 18, ultraviolet or near ultraviolet light units 8, camera 35, or other electronic components used within the display 10.

FIG. 3 further illustrates the placement of the camera 35 configured to capture images of textual input made on the front panel 15. The camera 35 may be located within the electronics housing 45 located below the frame 16. Placing the camera behind the display 10 results in zero camera blind spots due to the transparency of the display 10. In some configurations, the display 10 is transparent when the active display panel 17 is both active and not active. The ultraviolet or near ultraviolet light units 8 do not interfere with the camera's ability to capture images of editable input on the front panel 15 of the display 10 because the material of the transparent display 17 acts as a UV filter. Furthermore, the backlight LED strips 18 also do not interfere with ability of the camera 35 to capture images of a user's input, since in some configurations, the backlight LED strips 18 are turned off at the time of image capture.

Figure 4A:
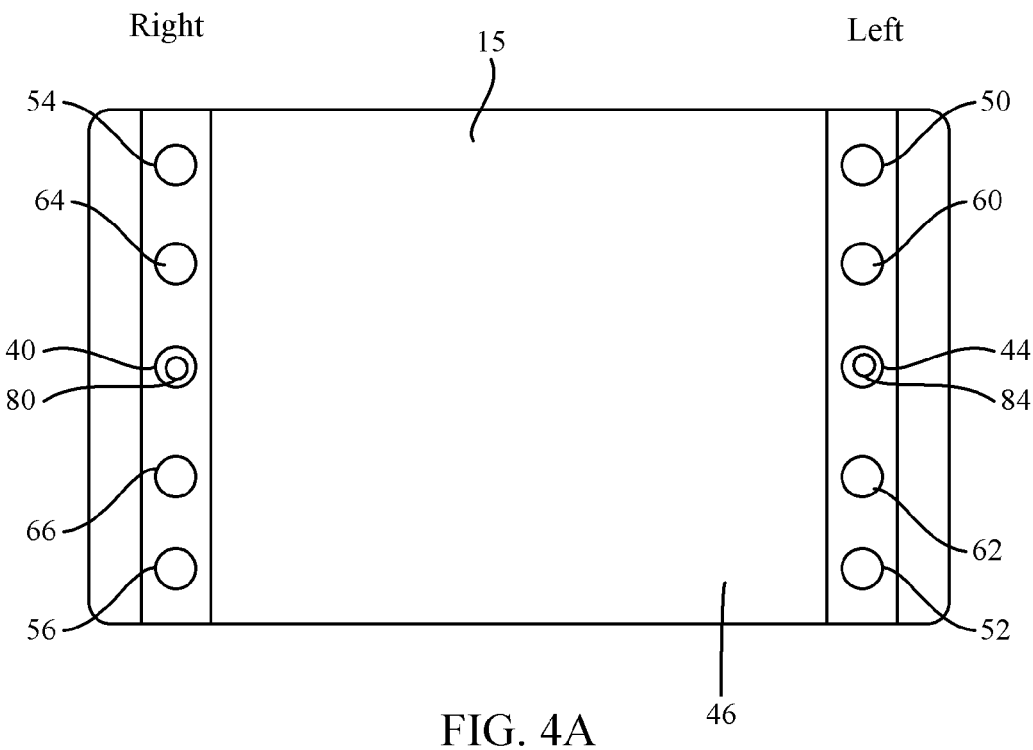
FIG. 4A is a schematic drawing of the underside of a detachable front panel of the touch sensitive display device of FIG. 2.

FIG. 4A schematically illustrates the underside 46 of the detachable front panel 15, that is, the side of the front panel 15 that faces the active display panel 17 when the front panel 15 is attached. The designations "Left" and "Right" in the figures refer to the orientation of the front panel 15 and the display device 10 as viewed by a user with the device 10 fully assembled with the front panel 15 attached. As shown, the front panel 15 may be detachably secured to the display device 10 by a magnetic coupling of two sets of magnet pairs. In other embodiments, more than two sets of magnet pairs may be used to secure the front panel 15 to the display device 10.

As shown in FIG. 4A, two magnets 40 and 44 are adhered to the underside of the front panel 15. The magnets 40 and 44 are preferably bonded to the underside of the front panel 15 but may be secured to the front panel 15 by other adhesion means. As shown in FIG. 4A, the magnets 40 and 44 are located at the approximate midpoint of the height of the front panel 15.

A plurality of high PSI foam members 50, 52, 54, and 56 may be located in each of the four corners of the underside 46 of the front panel 15, as shown in FIG. 4A. User pressure on the front panel 15 of the display 10 will press the high PSI foam members 50, 52, 54, and 56 against corresponding pressure sensors located on the frame 16 of the display to generate a set of pressure signals that indicate a user touch on the front panel 15. In one configuration, the high PSI foam members 50, 52, 54, and 56 may be made of an ultra-strength neoprene rubber material having a durometer of 60 A and tensile strength of 2500 PSI, such as those distributed by McMaster-Carr having the manufacturers' part number 8463K412.

Low PSI foam members 80 and 84 may be bonded to each magnet 40 and 44 on the underside 46 of the front panel 15. The low PSI foam members 80 and 84 may be made of cartilage foam having a lower PSI than the high PSI foam members 50, 52, 54, and 56. In one configuration, the low PSI foam member may be cartilage material such as PORON Urethane Foam manufactured by Rogers Corporation, part number 4701-40-20062-04, having a width of 1.57 mm.

A plurality of grooves 60, 62, 64, 66 may be located on the underside 46 of the front panel 15. These grooves or notches may accommodate the UV lights 8 in order to allow the ultraviolet or near ultraviolet light to tunnel through the glass.

Figure 4B:
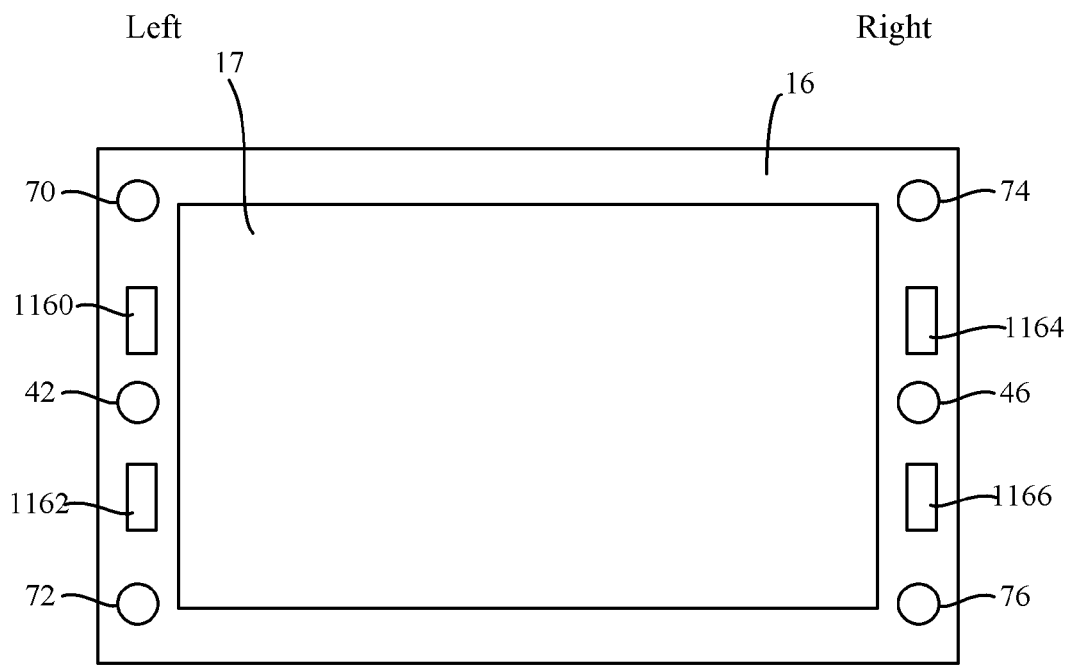
FIG. 4B is a schematic drawing of the display device of FIG. 2 with the front panel detached.

FIG. 4B schematically illustrates the active display panel 17 and the frame 16 of display 10 with the front panel 15 detached. As shown, the frame 16 surrounds all sides of the active display panel 17. In other embodiments, the frame 16 may surround the left and right sides and not the top and bottom of the active display panel 17. As discussed above, the front panel 15 may be detachably secured to the display device 10 by a magnetic coupling of two sets of magnet pairs. As shown in FIG. 4B, two magnets 42 and 46 are adhered to the frame 16 of the display device 10. The magnets 42 and 46 are preferably bonded to the frame 16 of the display device 10 but may be secured by other adhesion means. As shown, the magnets 42 and 46 are located within a central position of the sides of the frame 16. In other embodiments, low PSI foam members 80 and 84 may be secured to the magnets 42 and 46, facing the underside 46 of the front panel 15.

A plurality of UV heat sinks 1160, 1162, 1164, and 1166 may be mounted on the frame 16 on the legs of the device. In one configuration, the UV heat sinks may be composed of a metal heat sink on which is hot ironed or welded another heat sink such as a STAR heat sink. In one configuration, the STAR heat sink may be a thermal substrate having manufacturer number 803122, manufactured by Bergquist Company (Chanhassen, Minn.). The UV light units 8 may be mounted on top of the heat sinks 1160, 1162, 1164, 1166 such that the UV light units fit within the grooves 60, 62, 64, 66 to allow ultraviolet or near ultraviolet light to tunnel through the front panel 15.

A plurality of pressure sensors 70, 72, 74, and 76 may be located on the legs 20, and 25 (not shown) or on the frame 16 of the display 10, near the four corners of the display panel 17. Movement of the front panel 15 with respect to the display produces a pressure signal that may be analyzed to determine the position of a user's touch and the type of user command gesture. In other embodiments, the high PSI foam members 50, 52, 54, and 56 may be bonded to the outside surface of the pressure sensors 70, 72, 74, and 76 facing the underside of the front panel 15. In one configuration, the pressure sensors 70, 72, 74, and 76 may be single-zone force sensing resistors distributed by Interlink Electronics as part number FSR 402 having a 14.7 mm diameter active area.

When the front panel 15 is detachably secured to the display device 10, the magnets 42 and 46 provide magnetic coupling of the front panel 15 to the display device when matched with the corresponding magnet 40 and 44 on the underside of the front panel 15. For example, the magnets 40, 42, 44, and 46 are oriented such that magnets 42 and 44 are magnetically attracted and magnets 40 and 46 are magnetically attracted to provide a magnetic coupling to attach the front panel 15 to the display device 10.

In other embodiments the magnet pairs may be located closer to the top or the bottom of the legs 20 and 25 of the frame 16 of the display device 10. In one configuration, the magnets may be Neodymium Disc Magnets, product number D91-N52 distributed by K&J Magnets having an attach force of 4.5 lbs. Depending on the weight of the front panel 15, magnets of varying strength or more than one set of magnets per side may be required.

The magnets 40, 42, 44, and 46 are configured to secure the front panel 15 to the display device 10 such that a small gap exists between the front panel 15 and the active display panel 17. The small gap between the front panel 15 and the active display panel 17 allows the front panel 15 to move with respect to the display panel 17 and the pressure sensors 70, 72, 74, and 76. Therefore, user pressure on the front panel 15 initiates movement of the front panel 15 which causes the high PSI foam members 50, 52, 54, and 56 to apply pressure to the corresponding pressure sensors 70, 72, 74, and 76 with varying amounts of force. The gap between the front panel 15 and the active display panel 17 also helps to prevent scratching the active display surface 17 should there be foreign material or debris on the underside of the front panel 15. The gap further helps to prevent scratches on the active display panel 17 due to general removal and placement of the front panel 15 by the user. In some configurations, the gap between the front panel 15 and the active display panel 17 may be about 3 mm. In other configurations, the gap between the front panel 15 and the active display panel may be about 2 mm or smaller.

The low PSI foam members 80 and 84 secured to one magnet of each magnet pair enable the front panel 15 to tilt and/or move toward the display panel 17 in a compressive reaction to a user touch and cushion the movement of the front panel 15 with respect to the display panel 17. The low PSI foam members 80 and 84 also act as springs to enable the front panel 15 to return to a neutral position with respect to the pressure sensors 70, 72, 74, and 76 after the release of a user's touch on the front panel 15. The low PSI foam members 80 and 84 may be bonded to either magnet of the magnet pairs that attach the front panel 15 to the display device 10. In one configuration, low PSI foam member 80 may overlay and be bonded to magnet 40 and low PSI foam member 84 may overlay and be bonded to magnet 44 on the underside of the front panel 15. In other configurations, the low PSI foam member 80 may be bonded to magnet 42 and low PSI foam member 84 may be bonded to magnet 46 positioned near the center of the legs 20 and 25 of the display device 10.

When the front panel 15 is attached to the display 15, the high PSI foam members 50, 52, 54, and 56 are aligned with the corresponding pressure sensors 70, 72, 74, and 76. User pressure on the front panel 15 of the display 10 will press the high PSI foam members 50, 52, 54, and 56 against the corresponding pressure sensors 70, 72, 74, and 76 to generate a pressure signal from each of the four sensors 70, 72, 74, and 76. These signals may be analyzed to determine a location of a user's touch on the front panel 15, as will be discussed in more detail below. The signals may also be analyzed to determine the type of user gesture made, the associated command associated with the user gesture, or to activate a textual input mode, as will be discussed in greater detail below.

As will be discussed in further herein, a processor receives the signals from the pressure sensors 70, 72, 74, and 76 and associates the pressure signals with a user gesture. The sensors are configured to be able to determine the location of pressure from a user touch on the front panel based on relative pressure differentials between the sensors. The pressure sensors 70, 72, 74, and 76 represent one means for receiving user input on the front panel 15 of the touch sensitive display device 10.

Figure 5:
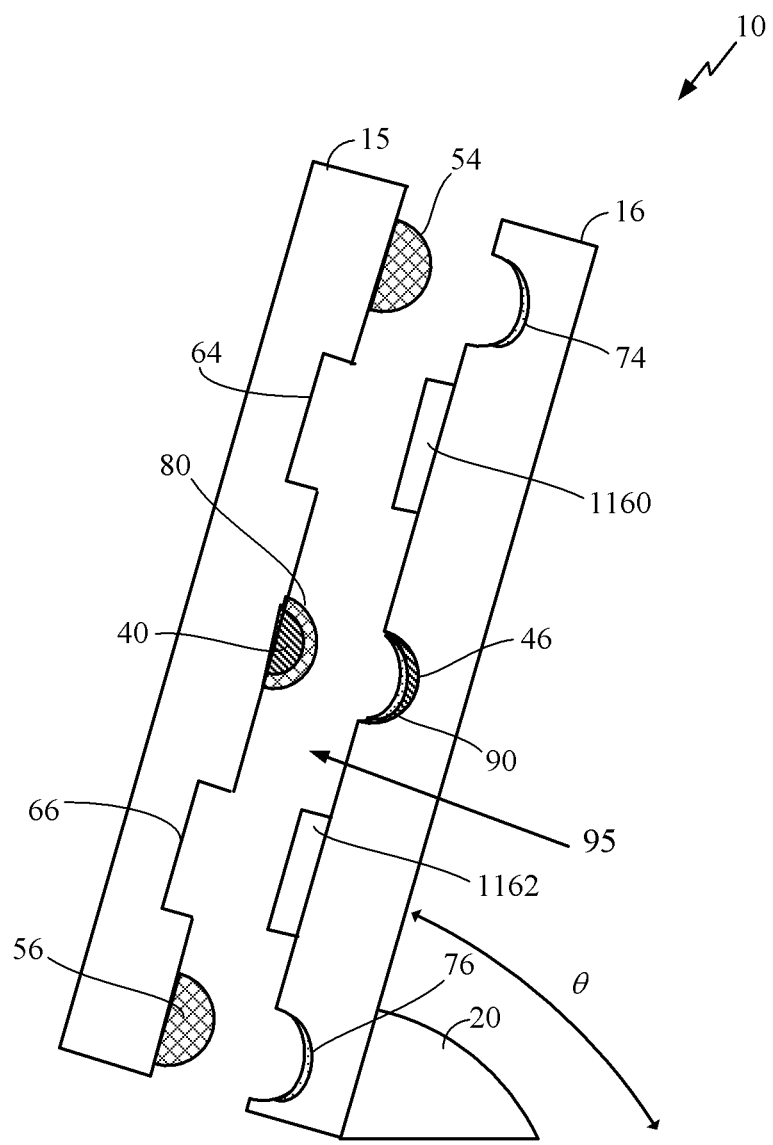
FIG. 5 is a schematic cross sectional view of the display device of FIG. 2.

A cross sectional view of the display device 10 is shown in FIG. 5. This view shows a cross section through the magnets and pressure sensors located on the right side of the display device 10. In this figure, magnets 40 and 46 are paired to secure the front panel 15 to the display device 10. The low PSI foam member 80 is sandwiched between the magnets 40 and 46 to act a spring to return the front panel 15 to a neutral position after the release of pressure from a user's touch. FIG. 5 depicts one low PSI foam member 80; however, the corresponding foam member 84 (not shown) is located on the opposite side (the left side) of the display 10.

In some embodiments, a high friction material such as sand paper may be provided between the magnets of each pair to hold the front panel 15 securely to the display device 10 with minimal or no slipping. In some configurations, the high friction film or sand paper may be secured between the magnet attached to the frame or leg and the low PSI foam member attached to the magnet secured to the underside 46 of the front panel 15. This high friction film prevents the frontal glass from sliding down or from side to side. As shown in FIG. 5, a high friction film member 90 is further sandwiched between the magnets 40 and 46 to minimize downward or side to side slippage of the front panel 15. In some configurations, the high friction material may be sandpaper such as Norton Tufbak Gold T481 having 220 A-WT. This high friction material may stand up to repeated washings over time as the front panel 15 is washed. In addition, this material is rough enough to grip the low PSI foam member without ripping the foam member.

Correspondingly, on the other side of the display (not shown), magnets 42 and 44 are paired help hold the front panel 15 to the display device 10, with low PSI foam member 84 and a second high friction film member 90 sandwiched between the magnets 42 and 44. The low PSI foam members 80 and 84 act as grip surfaces for the high friction material 90 to "bite" into as the magnets 40, 42, 44, and 46 compress the foam and film.

A gap 95 between the front panel 15 and the frame 16 may be seen more clearly in FIG. 5. The gap 95 allows the front panel 15 to move with respect to the frame 16 and active display panel 17 in response to the pressure from a user's touch.

The high PSI foam members 54 and 56 are aligned with the pressure sensors 74 and 76, as shown in FIG. 5. The movement of the front panel 15 with respect to the display 10 will press the high PSI foam member against the corresponding pressure sensor, and trigger a pressure signal from each pressure sensor. Movement of the front panel 15 may cause the high PSI foam member to press against the corresponding pressure sensor or may cause the high PSI foam member to release from the corresponding pressure sensor.

For example, when a user touches the top right quadrant of the display, the top right corner of the front panel 15 will move towards the frame 16, pressing high PSI foam member 54 against the pressure sensor 74. The rigidity of the front panel 15 will cause the lower right corner of the front panel 15 to lift away from the frame 16. Movement of the front panel 15 in response to pressure from a user's touch will result in different responses from the pressure sensors on each side of the display 10. These responses may be analyzed to determine a location of the user's touch on the front panel 15 and may be correlated to a specific application or window active at the position of the user's touch in order to perform the desired command within the user-selected application.

Editable Handwriting Capture Feature Overview

In one embodiment of the invention, editable handwriting may be captured on the touch-sensitive display device 10 using the camera 35 and ultraviolet or near ultraviolet light units 8. The UV light illuminates the handwriting and an integrated camera captures an image of the handwriting, which can include sketches or text, made on the front panel 15 using a pen having water soluble transparent or nontransparent fluorescent ink. In some embodiments, other marking devices that may be easily wiped off the front panel may be used. The applied pressure of a user's touch on the front panel 15 of the display 10, as measured by at least one pressure sensor 70, 72, 74, and 76 mounted to the display 10, at a specified location on the display, may indicate that the user desires to enter a textual input mode. This can trigger the illumination of the UV lights, and the beginning of a camera capture session. In other embodiments, the user may specify the start of a textual input mode by selecting a specific option or by activating a mechanical switch on the display. In response to this command, the UV lights 8 may be turned on and the camera may begin to capture video or still images of the screen.

User interaction with the device may take the form of handwriting, drawings, notes, sketches, or memos made directly on the detachable front panel 15 of the touchscreen device. The notes or memos may be made with a pen having water soluble fluorescent ink that is transparent or nontransparent such that the notes are visible under ultraviolet or near ultraviolet light and transparent when little or no ultraviolet or near ultraviolet light is present. Transparent ink of different colors may be used. The use of transparent ink allows the markings to become transparent when the ultraviolet light is turned off, allowing use of the display without erasing or removing the markings. Nontransparent or pigmented pens, such as white board markers, which also glow under ultraviolet light, could also be used in some embodiments if immediate transparency of the ink upon turning off the ultraviolet light is not desired.

The user may indicate, through touch interaction at a specified location on the touchscreen display or through other means, completion of textual input and a desire to incorporate the textual input into a specified application, such as a word processing application. Upon the user's command, an image of the handwriting or notes may be captured by the camera 35 mounted behind the display 10. Prior to capturing the image, the backlight LED light strips 18 may be turned off and the transparent active display panel 17 may be set to full screen white, making it fully transparent to the camera. Under these conditions, the fluorescent markings will appear visible on the front panel 15. The camera 35 may capture an image of the textual input 105 and additional processing may be performed to interpret and incorporate this input into a specified application, such as updating a calendar application. Capturing an image of the textual markings may also include determining alphanumeric characters within the fluorescent markings. When the image is captured by the camera 35, the transparent active display 17 acts as a UV filter to reject any ultraviolet light from the environment. This filtering helps to prevent a blue-tinge from appearing in the captured image. In other configurations, a UV filter may be added in front of the camera 35, as a coating on the active display 17 or the back panel 30, or anywhere in the path of light from the front panel 15 to the camera 35, to prevent a blue-tinge from appearing in the captured image.

When the user desires to exit a textual input mode, the UV lights 8 may be turned off, allowing for an unobstructed view of the active display panel 17, since the textual input is no longer fluorescing and visible to the user.

Editable Handwriting Capture System Overview

Figure 6:
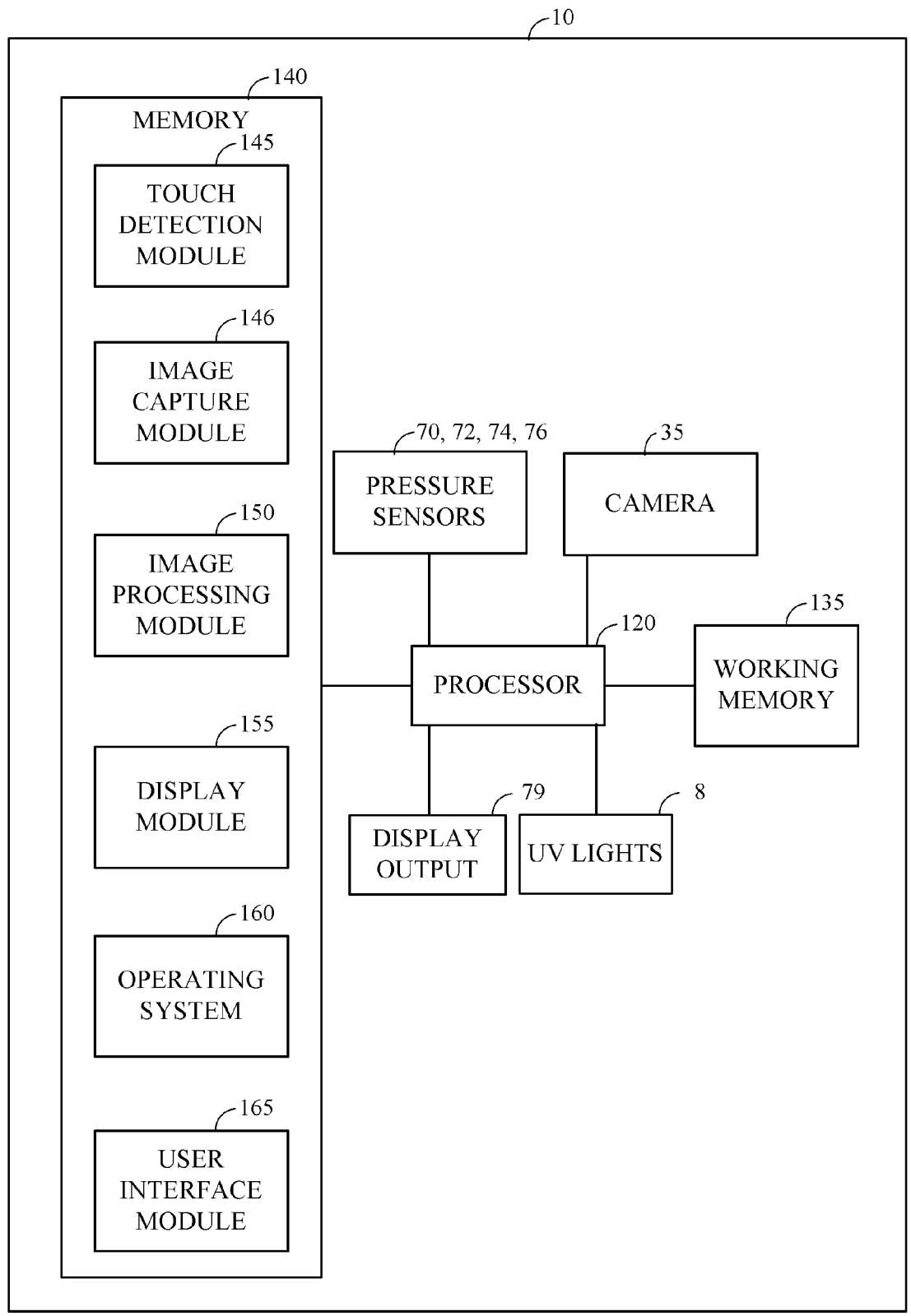
FIG. 6 is a schematic block diagram depicting a touch sensitive display system implementing some operative elements.

A high-level block diagram of one embodiment of a touch sensitive display device 10 configured with editable handwriting capture and recognition is shown in FIG. 6. The touch sensitive display system 10 may be incorporated into the electronics housing 45 to control the functions of the display such as the active display panel, backlight LED strips, ultraviolet or near ultraviolet light units 8, camera 35, or other electronic components used within the display 10. As shown, the system 10 has a set of components including a processor 120 linked to a plurality of pressure sensors 70, 72, 74, and 76 and a display output 79. The camera 35 and ultraviolet or near ultraviolet light units 8 are also linked to processor 120. A working memory 135 and memory 140 are also in communication with processor 120. The touch sensitive display system 10 may also connect to a computer in order to provide additional applications and functions for the display, such as word processing, video and audio functions, or interactive browsing via the Internet.

Touch sensitive display system 10 may be a stationary device such as a display built into a kitchen cabinet unit, refrigerator, or other appliance or it may be a standalone display unit. A plurality of applications may be available to the user on touch sensitive display system 10 via an attached computer system. These applications may include but are not limited to calendar viewing and editing functions, word processing functions, recipe editing and viewing functions, video and imaging display functions, and internet browsing functions.

Processor 120 may be a general purpose processing unit or a processor specially designed for display applications. As shown, the processor 120 is connected to a memory 140 and a working memory 135. In the illustrated embodiment, the memory 140 stores a touch detection module 145, an image capture module 146, an image processing module 150, a display module 155, operating system 160, and user interface module 165. These modules may include instructions that configure the processor 120 to perform various display, touch sensing, image capture, and image processing functions and device management tasks. Working memory 135 may be used by processor 120 to store a working set of processor instructions contained in the modules of memory 140. Alternatively, working memory 135 may also be used by processor 120 to store dynamic data created during the operation of touch sensitive display system 10.

As mentioned above, the processor 120 is configured by several modules stored in the memory 140. Touch detection module 145 includes instructions that configure the processor 120 to detect a user's touch on the front panel 15 of the display 10 by analyzing the signals received from the pressure sensors 70, 72, 74, and 76. Therefore, processor 120, along with touch detection module 145 and pressure sensors 70, 72, 74, and 76 represent one means for detecting a user's touch on the front panel 15 of the display device 10.

The image capture module 146 provides instructions that configure the processor 120 to capture an image of a user's editable handwritten input made on the front panel 15 of the display 10 using the camera 35. A user's touch on the front panel 15 may trigger the initiation of textual input functions while a user's release of pressure from the front panel 15 may trigger the cessation of textual input functions and may trigger a query to the user regarding capturing an image of the textual input. Therefore, processor 120, along with image capture module 146 and camera 35 represent one means for capturing one or more images of textual input made on the second panel of the touch-sensitive display device.

The image processing module 150 provides instructions that configure the processor 120 to process the pressure sensor data and the captured images to determine how the information in the images should be processed. The image processing module 150 can perform a variety of functions on the received images, including, for example, color signal processing, analog-to-digital conversion and/or gamma correction. The image processing module 150 can receive one image or a sequence of images from the camera 35 and can be configured to invert each image to generate a mirrored image. The image processing module 150 can use the inverted and/or non-inverted image to perform additional processing tasks or may send the image or images to a processor connected to the camera and display for additional processing. The data can also be stored as image data within the memory 140.

The user interface module 165 includes instructions that configure the processor 120 to display information on the active display panel 17 of the display device 10.

The various modules can be implemented in various combinations of hardware and/or software. For example, the touch detection module 145, the image capture module 146, the image processing module 150, the display module 155, and the user interface module 165 can be implemented as instructions stored on a computer readable storage medium configured to execute using one or more processors. Additional details regarding the implementation of the modules will be described in detail later below.

Operating system 160 configures the processor 120 to manage the memory and processing resources of system 10. For example, operating system 160 may include device drivers to manage hardware resources such as the display output, pressure sensors 70, 72, 74, and 76, and camera 35. Therefore, in some embodiments, instructions contained in the touch sensitive display system modules discussed above may not interact with these hardware resources directly, but instead interact through standard subroutines or APIs located in operating system component 160. Instructions within operating system 160 may then interact directly with these hardware components.

Although FIG. 6 depicts a device comprising separate components to include a processor, a plurality of pressure sensors, electronic display output, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 6 illustrates two memory components, including memory component 140 comprising several modules and a separate memory 135 comprising a working memory, one with skill in the art would recognize several embodiments utilizing different memory architectures. For example, a design may utilize ROM or static RAM memory for the storage of processor instructions implementing the modules contained in memory 140. Alternatively, processor instructions may be read at system startup from a disk storage device that is integrated into touch sensitive display system 10 or connected via an external device port. The processor instructions may then be loaded into RAM to facilitate execution by the processor. For example, working memory 135 may be a RAM memory, with instructions loaded into working memory 135 before execution by the processor 120.

Editable Handwriting Capture Overview

Figure 7:
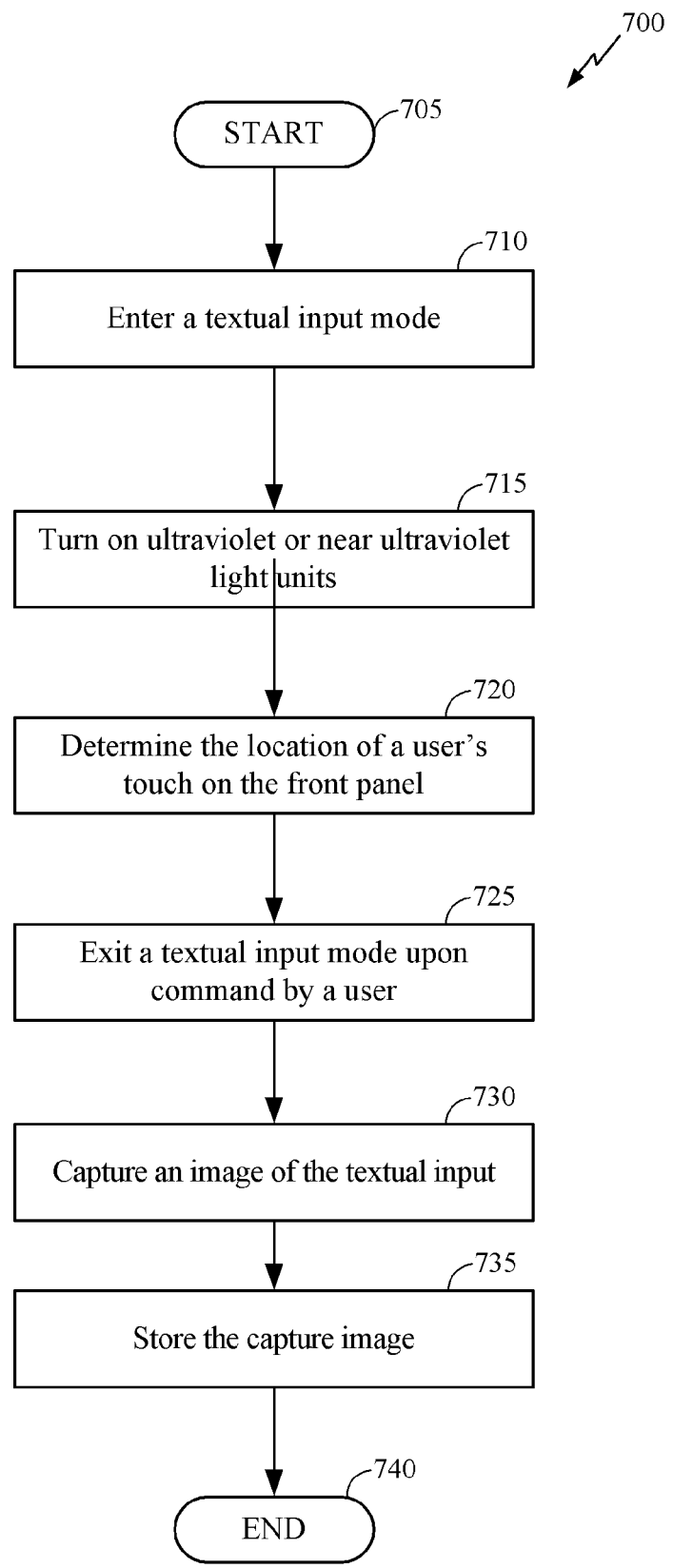
FIG. 7 is a flow chart illustrating a editable handwriting capture process, according to one implementation.

FIG. 7 is a high-level flow chart illustrating a process 700 that depicts an overview of an editable handwriting capture process that may be implemented on a touch-sensitive electronic display such as display device 10. Process 700 may be used in some embodiments to capture an image or a series of images of a user's textual input made on the front panel 15 of a display device 10 and interpret this image or images to update or add information to an application.

The process 700 begins at start block 705 and transitions to block 710 wherein the display device enters a textual input mode. In some configurations, a user may click a button to enter a calendar application and click an additional icon to indicate an editing process or textual input mode. Process 700 then transitions to block 715 wherein the ultraviolet light units 8 are instructed to turn on in response to the indication to enter a textual input mode. The ultraviolet light units may be turned on in response to detecting a user's touch on the touch-sensitive electronic display.

After the ultraviolet or near ultraviolet light units and the camera have been turned on, process 700 transitions to block 720, wherein the location of the user's touch on the front panel is determined. For each user touch or gesture, the duration of the touch, the direction or path of any movement of the touch, and any acceleration of movement of the touch may be determined. The location of the user's touch may be determined from the magnitude of the pressure signals received by the processor and the known locations and distances between each of the plurality of pressure sensors. The location of the user's touch on the screen may indicate the context of the user's interaction with the display device. For example, the location of the user's touch may indicate that the user is interacting with an internet browser window or with a text editing application, depending on the displayed location of each application on the display device. In one embodiment, the system divides the screen into a two-dimensional coordinate system and compares the coordinates of the detected user's touch with the coordinates of user interface features currently being displayed on the screen. This alignment allows the system to determine if the user's touch is correlated to a particular user interface feature, such as a button, icon, or other item displayed on the screen. In some configurations, the use of a pen to select an item on a calendar may indicate that the user wishes to edit a calendar entry. In other configurations, a user may select a notepad or other text entry program by clicking a button or selecting an icon to indicate the context of the user's interaction with the display device.

During this time, the user may enter information directly on the front panel of the display device by writing or marking on the front panel with a pen having water soluble fluorescent ink that is transparent or nontransparent such that the notes or input are visible under ultraviolet or near ultraviolet light and transparent when little or no ultraviolet or near ultraviolet light is present. The transparency of the fluorescent markings when little or no ultraviolet or near ultraviolet light is present allows the user to enter and exit the textual input mode by turning the ultraviolet or near ultraviolet lights on and off without cleaning off any fluorescent pen markings on the front panel. In some configurations, the user may enter information directly on the front panel to edit a calendar item or write a to-do item on a notepad application.

Process 700 continues in a textual input mode until the user commands the end of the textual input mode, as in block 725. When the user commands the end of a textual input mode, process 700 transitions to block 730 wherein an image of the textual input is captured. Due to the glowing effect of the fluorescent pen markings under ultraviolet or near ultraviolet light, the sketches and other user input on the front panel may be captured clearly by the camera and alphanumeric characters may be determined from the fluorescent markings. During a snapshot, the LED light strips are turned off and the transparent active display panel is set to full screen white, making it fully transparent so that the camera can clearly view the markings on the front panel. The transparent active display panel acts as an ultraviolet or near ultraviolet filter to reject unwanted ultraviolet or near ultraviolet radiation on the front panel when the camera takes a snapshot of the user input. This desirably removes any blue-tinted background from the image captured of the markings on the front panel. This image may initially be backward but may be reversed through image processing functions. The user can easily edit sketches and text prior to the snapshot by wiping portions of the front panel with a wet cloth or other cleaning method to erase unwanted markings. The front panel may be wiped clean with a wet cloth or other cleaning method when the textual input is no longer desired or after an image of the textual input has been captured by the camera.

Once the image of a user's textual input is captured, process 700 transitions to block 735 wherein the captured image is stored in a memory location. After the image has been stored, process 700 transitions to block 740 and ends. Further processing may be done on the images captured by the camera, such as handwriting recognition, image processing, etc., by a processor connected to the camera and display.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A touch-sensitive display device, comprising:
   a frame structure;
   a first panel mounted on the frame structure and configured to display information from an electronic device;
   a transparent second panel detachably secured to the first panel and configured to cover the first panel;
   at least one ultraviolet or near ultraviolet light unit mounted on a front surface of the frame structure adjacent to the first panel such that when the transparent second panel is detachably secured to the first panel, the transparent second panel covers the at least one ultraviolet or near ultraviolet light unit, the at least one ultraviolet or near ultraviolet light unit configured to provide UV light to an edge of the transparent second panel; and
   a camera mounted behind the first and second panels configured to capture an image taken through the first and second panels of fluorescent markings made on the transparent second panel.

2. The display of claim 1, wherein the second panel comprises bezel-less glass.

3. The display of claim 1, wherein the second panel is detachably secured to the first panel by a plurality of magnets.

4. The display of claim 1 further comprising at least one pressure sensor coupled to the frame structure and configured to determine a location of a user touch on the second panel.

5. The display of claim 4, wherein the at least one ultraviolet or near ultraviolet light unit is configured to be turned on in response to a touch event on the second panel.

6. The display of claim 1, wherein the camera is coupled to the frame structure behind the first and second panels.

7. A system to capture textual input on a touch-sensitive display device, comprising:
   a touch-sensitive display device comprised of a first panel configured to display information from an electronic device, a transparent second panel detachably secured to the first panel and configured to cover the first panel, at least one ultraviolet or near ultraviolet light unit mounted on a front surface of the frame structure adjacent to the first panel such that when the transparent second panel is detachably secured to the first panel, the transparent second panel covers the at least one ultraviolet or near ultraviolet light unit, the at least one ultraviolet or near ultraviolet light unit configured to provide UV light to an edge of the transparent second panel, and a camera mounted behind the first and second panels configured to capture an image of fluorescent markings made on the transparent second panel, the image taken through the first and second panels; and
   a control module configured to:
      activate the at least one ultraviolet or near ultraviolet light unit when the device enters a textual input mode;
      capture one or more images of the fluorescent markings made on the second panel of the touch-sensitive display device;
      deactivate the at least one ultraviolet or near ultraviolet light unit when the device exits a textual input mode; and
      store the images of the fluorescent markings in a memory location.

8. The system of claim 7 further comprising at least one pressure sensor, wherein the control module is further configured to detect input from the at least one pressure sensor by obtaining a sensor signal including information on a user touch event on the second panel.

9. The system of claim 8, wherein the control module is further configured to determine the position of a user's touch on the second panel by determining location coordinates of the user touch event from the sensor signal.

10. A touch-sensitive display device, comprising:
    means for mounting an ultraviolet or near ultraviolet light unit on a front surface of the device;
    means for providing an ultraviolet or near ultraviolet light when the device enters a textual input mode;
    means for activating the ultraviolet or near ultraviolet light unit when the device enters a textual input mode;
    means for capturing one or more images of fluorescent markings made on the transparent second panel, the one or more images taken through the touchscreen; and
    means for deactivating the ultraviolet light unit and discontinuing capture of images of fluorescent markings when the device exits a textual input mode.

11. The device of claim 10, wherein the means for capturing one or more images comprises a camera.

12. The device of claim 10, wherein the means for providing an ultraviolet or near ultraviolet light comprises one or more ultraviolet or near ultraviolet light sources configured to shine light through the touchscreen.

* * * * *